May 5, 1925.　　　　　　　　　　　　　　　　1,536,288

A. L. FREEDLANDER ET AL

METHOD OF MANUFACTURE OF RUBBER COMPOUND

Original Filed Dec. 26, 1922

Inventors
Abraham L. Freedlander,
William G. Goodwin,

By Toulmin & Toulmin

Attorneys

Patented May 5, 1925.

1,536,288

UNITED STATES PATENT OFFICE.

ABRAHAM L. FREEDLANDER AND WILLIAM G. GOODWIN, OF DAYTON, OHIO, ASSIGNORS TO THE RUBBER DEVELOPMENT COMPANY, OF DAYTON, OHIO, A TRUST ESTATE.

METHOD OF MANUFACTURE OF RUBBER COMPOUND.

Original application filed December 26, 1922, Serial No. 608,978. Divided and this application filed October 27, 1923. Serial No. 671,256.

*To all whom it may concern:*

Be it known that we, ABRAHAM L. FREEDLANDER and WILLIAM G. GOODWIN, citizens of the United States, residing at Dayton, in the county of Montgomery and State of Ohio, have invented certain new and useful Improvements in Methods of Manufacture of Rubber Compound, of which the following is a specification, reference being had therein to the accompanying drawing.

Our invention relates to a rubber compound and its method of manufacture and adaptation.

This application is a division of application Serial Number 608,978.

The object of our invention is to provide a rubber compound and the resulting article of manufacture which, upon vulcanization will be resistent to acids, fumes, temperature changes, electric and static influences, and the like.

It is also our object to provide from such a compound an article of manufacture that will be approximately one-third the weight of the present hard rubber compounds known in the art, will have a strength comparative with the strength of the hard rubber known in the art and will be capable of being deformed without breaking while at the same time being capable of a certain degree of resiliency in the same manner that steel is resilient and is also capable of being deformed. The resulting article of manufacture and our method of producing it permits of the production of articles of the same predetermined characteristics so that uniform quality may be obtained in each article.

It is also our object to provide a compound which, when molded according to our process in connection with other articles such as steel, will adhere thereto and form a permanent union with such steel articles. It will also adhere to rubber compounds such as hard rubber articles.

Referring to the drawings.

Figure 1:
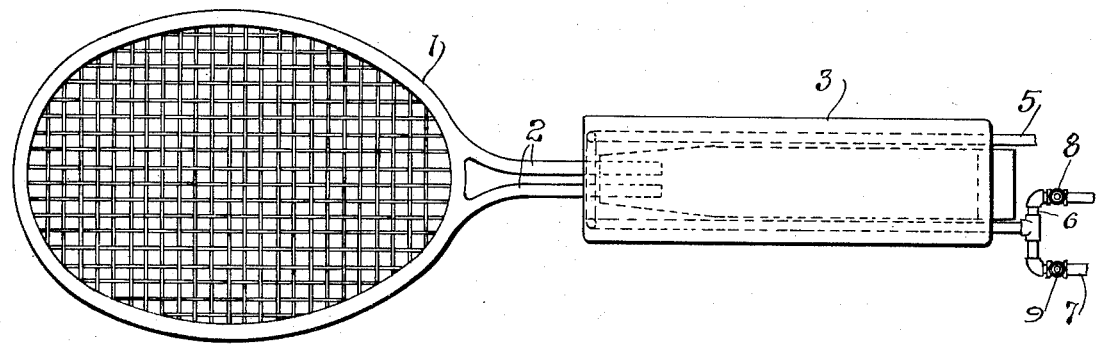
Figure 1 illustrates the method used for applying a handle composed of our compound to a metal frame tennis racket.
Figure 2:
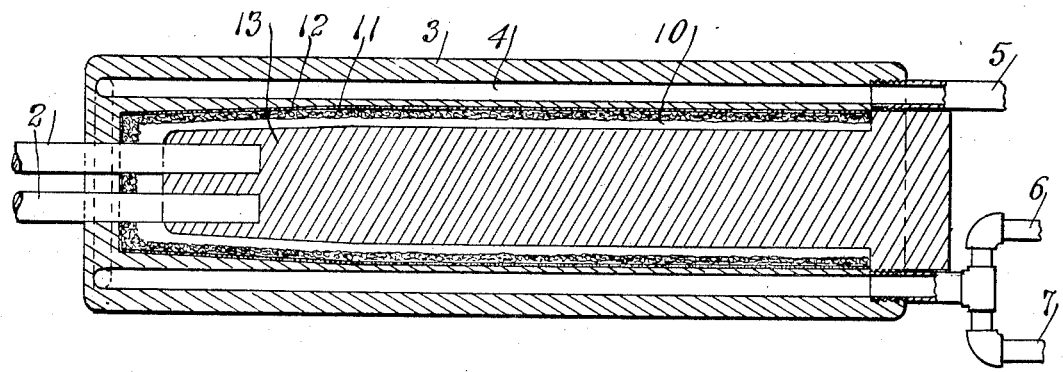
Fig. 2 is an enlarged section of the mold for making this typical application of our compound to a commercial use.

The compound consists of the following ingredients:—

Smoke sheets of rubber, rosin oil, sulphur, ammonium bicarbonate, dehydrated lime, and ethyl-idene-aniline, and gas black.

It is preferred to mix these several ingredients in fifty to one hundred pound lots. The following is a description of the method of mixing and preparing this compound on the basis of a one hundred pound lot.

We take the smoke sheets of rubber and masticate them for fifty minutes according to the usual practice. In the place of the smoke sheets we may substitute fine para having the characteristic of great strength. We select 61 pounds and 12 oz. of such rubber.

It is essential that this rubber when finally made up be used before it is twenty-four hours old because after that time it begins to recover its resiliency.

When these smoke sheets are worked on the mill until plastic at which time they have achieved a temperature of approximately 130° to 180° Fahrenheit, the latter temperature being approximately the safety temperature, we add rosin oil to the extent of 1 pound and 13 oz. This is a softening and volatilizing agent. We then add sulphur by sifting it in slowly as the rubber is being worked on the mill. We use for this purpose 18 pounds and 6 oz. of the sulphur which is of the fineness to pass through 300 mesh screen. The sulphur is used for the usual purpose in compounds for promoting the vulcanization. Thereafter while the mixing is taking place the dehydrated lime which has been ground as fine as it is possible to secure it is incorporated in the mass to the extent of 3 pounds and 1 oz. The lime is used to toughen the compound and accelerates the reaction between the rubber and the sulphur. We then add 1 pound and 8 oz. of gas black for the purpose of giving color and some body to the mixture, but this may be omitted.

In the meanwhile, the ethyl-idene-aniline has been heated in a steam jacketed kettle to about the temperature of boiling water, that is to about 212° Fahrenheit. We then dip this out of the kettle and incorporate 1 pound and 4 oz. thereof in the mixture in the mill. This acts as an accelerator to the reaction and adds tenacity to the resulting compound.

The last ingredient added is the ammonium bicarbonate to the extent of 4 pounds and 12 oz. This is added to give the spongy or aerated character to the compound. It is added last because the heat of mixing in the mill would volatilize it if added earlier in the process.

It is essential that this compound be molded and vulcanized or blown within twelve hours after it has been mixed. The preferred practice is to mix fresh batches each day.

The temperature of the room in which it is kept and in which it has been mixed should be approximately 70° Fahrenheit.

When it is desired to mold this compound into finished articles it is placed in a metal mold which is jacketed for receiving steam under pressure and cold water. The compound is put in the mould and a mandrel is inserted about which the compound is to be molded or the article itself on which the compound is to be molded may be inserted in the mold, or both.

The mandrel is sometimes used to hold the article in position while the compound is molded or blown.

Figure 3:
Fig. 3 is a section through a portion of the finished article.

The term "blown" is used because, when the heat is applied to the mold, the compound expands and very great pressure is set up in the mold during this molding process. This results in the compound having a porous appearance as will be seen in Fig. 3.

In preparing the mold the space between the mandrel and the article about which the compound is to be molded is approximately half filled with the compound allowing the other half of the area for the expansion of the compound during the molding process.

In some cases where it is desired to have a soft rubber coating on the resulting article the mold is lined with a soft rubber sheet. It is preferable to cement this sheet to the inside of the mold. The sheet itself is about one-sixty-fourth of an inch in thickness.

When the mold is closed the steam is turned on and the mold is kept under heat for one hundred thirty-five minutes approximately. About one-third of this time in the beginning of the molding process the pressure of the steam is being gradually increased until it reaches a maximum of eighty pounds. The remainder of the time the steam is held at an eighty pound pressure. At the end of the period the steam is cut off and cold water is circulated through the mold to chill it and when it has been cooled the mold is opened, the mandrel is extracted and the finished article is thus completed.

These times are approximately depending upon the exact character of the resulting material desired. The time may be varied from fifty minutes to one hundred thirty-five minutes by varying the quantity of lime and ethyl-idene-aniline. The larger the quantity of such agents the less time needed.

It will be understood that these quantities are approximate and some variation is possible. The resulting product formed will have a porous but relatively stiff interior portion, an impervious portion adjacent said interior portion and a relatively resilient exterior portion.

Referring to the drawings showing the actual application of this process and use of this compound 1 is the frame of rubber or steel of a tennis racket having throat members 2—2 about which the handle is to be molded.

We select a mold 3 having passageways 4 for the passage of steam or water from the pipes 5.

6 designates the steam line 7 the water line controlled respectively by the valves 8 and 9. The area 10 is provided in the mold in which the compound 11 is spread. It is usually desired to have a soft rubber coating for the compound. A rubber sheet 12 is provided for this purpose which is cemented on the inside of the mold so that when the article is blown the rubber sheet will be securely vulcanized to the exterior of the handle. A mandrel 13 is provided about which the handle is molded. The end of the mandrel is adapted to receive the ends of the throat members to hold them in position while the compound is being blown or molded about them.

The mold is opened up after the treatment of the compound has been effected, and then the mandrel is withdrawn leaving the handle molded on the racket.

While we have shown and described certain features as constituting our invention, it will be understood that parts have been shown for purposes of illustration only, and that we do not desire to be limited to such details, as obvious modifications will occur to persons skilled in the art. It will also be understood that some variation in time, temperature and quantity as well as substitution of materials of the same characteristics and reactions are contemplated.

Having thus fully described our invention, what we claim as new, and desire to secure by Letters Patent, is:—

1. In a method of manufacturing the herein described rubber compound, masticating smoke sheets of rubber approximately fifty minutes in a mill adding rosin oil, sifting in slowly finely powdered sulphur, adding finely powdered lime, all at a temperature between approximately 130° to 180° Fahrenheit, incorporating ethyl-idene-aniline previously brought to approximately 212° Fahrenheit, temperature and incorporating ammonium bicarbonate.

2. In a method of manufacturing the herein described rubber compound, masticating smoke sheets of rubber approximately fifty minutes in a mill adding rosin oil, sifting in slowly finely powdered sulphur, adding finely powdered lime, all at a temperature between approximately 130° to 180° Fahrenheit, incorporating ethyl-idene-aniline previously brought to approximately 212° Fahrenheit temperature and incorporating ammonium bicarbonate, and placing the mass in a molding chamber applying steam gradually until the pressure is approximately eighty pounds per square inch holding the pressure at approximately eighty pounds for two-thirds of the period and suddenly cooling the mold and the mass.

3. In a method of making herein described rubber compound, masticating smoke sheets, adding rosin oil, sifting in slowly finely powdered sulphur, adding finely powdered dehydrated lime and adding gas black, all while being masticated in a mill at temperature approximately 130° to 180° Fahrenheit; bringing ethyl-idene-aniline to the temperature of approximately 212° Fahrenheit and adding it to the mass; adding ammonium bicarbonate and allowing the entire mass to cool to approximately 70° Fahrenheit.

4. In a method of making herein described rubber compound, masticating smoke sheets, adding rosin oil, sifting in slowly finely powdered sulphur, adding finely powdered dehydrated lime and adding gas black, all while being masticated in a mill at temperature approximately 130° to 180° Fahrenheit; bringing ethyl-idene-aniline to the temperature of approximately 212° Fahrenheit and adding it to the mass; adding ammonium bicarbonate and allowing the entire mass to cool to approximately 70° Fahrenheit, placing in a mold, subjecting to heat for a predetermined period, gradually raising the heat during approximately the first third of the period and suddenly chilling the mold and mass.

5. In a method of producing the herein described rubber compound with a coating of resilient rubber, mixing smoke sheets, rosin oil, sulphur, and lime at approximately 130° to 180° Fahrenheit, adding ethylidene-aniline previously brought to about 212° Fahrenheit, adding ammonium bicarbonate and cooling the mass to approximately 70°; lining an interior of a mold with rubber sheets which are cemented therein, placing the mass on said sheets and heating the mold under approximately eighty pounds pressure a predetermined period raising the heat gradually during the first third of the period.

In testimony whereof, we affix our signatures.

ABRAHAM L. FREEDLANDER.
WILLIAM G. GOODWIN.